United States Patent
Iida et al.

(10) Patent No.: US 8,518,552 B2
(45) Date of Patent: *Aug. 27, 2013

(54) OPTICAL FILM AND METHOD FOR PRODUCTION THEREOF

(75) Inventors: Toshiyuki Iida, Ibaraki (JP); Tomoyuki Hirayama, Ibaraki (JP); Yutaka Ohmori, Ibaraki (JP); Miyuki Kurogi, Ibaraki (JP); Hisae Shimizu, Ibaraki (JP); Junichi Nagase, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 144 days.

This patent is subject to a terminal disclaimer.

(21) Appl. No.: 12/721,901

(22) Filed: Mar. 11, 2010

(65) Prior Publication Data

US 2010/0265579 A1      Oct. 21, 2010

(30) Foreign Application Priority Data

Apr. 16, 2009  (JP) .................................. 2009-100128

(51) Int. Cl.
| | |
|---|---|
| B32B 27/36 | (2006.01) |
| C08G 63/16 | (2006.01) |
| C08G 63/18 | (2006.01) |
| C08G 63/181 | (2006.01) |
| C08G 63/183 | (2006.01) |
| C08G 63/185 | (2006.01) |
| C08G 63/19 | (2006.01) |
| C08G 63/193 | (2006.01) |
| C08G 63/195 | (2006.01) |

(52) U.S. Cl.
USPC .......... 428/480; 428/332; 428/339; 428/1.31; 428/1.33; 525/427; 525/444

(58) Field of Classification Search
None
See application file for complete search history.

(56) References Cited

U.S. PATENT DOCUMENTS

| | | | | |
|---|---|---|---|---|
| 4,123,454 | A * | 10/1978 | Buxbaum | ..................... 528/173 |
| 4,617,370 | A * | 10/1986 | Lenz et al. | ..................... 528/191 |
| 4,654,412 | A * | 3/1987 | Calundann et al. | ........... 528/176 |
| 4,789,755 | A | 12/1988 | Van Sickle et al. | |
| 4,801,677 | A * | 1/1989 | Eckhardt et al. | .............. 528/176 |

(Continued)

FOREIGN PATENT DOCUMENTS

| | | | |
|---|---|---|---|
| EP | 1 387 210 | * | 2/2004 |
| JP | 62-121722 A | | 6/1987 |

(Continued)

OTHER PUBLICATIONS

Korean Office Action dated Jan. 9, 2012, issued in corresponding Korean Patent Application No. 2010-0026645.

(Continued)

*Primary Examiner* — Vivian Chen
(74) *Attorney, Agent, or Firm* — Westerman, Hattori, Daniels & Adrian, LLP (57) ABSTRACT

The invention relates to an optical film containing polymers having different repeating units, and methods for production thereof. Further, the invention also relates to an optical laminate, a polarizing plate, and an image display device each using the optical film. The optical film of the invention advantageously has not only high solubility in solvents but also a high level of transparency since the polymers used in the optical film are compatible with each other. Further, wavelength dispersion of the birefringence of the optical film can be controlled by merely changing a ratio of polymers.

15 Claims, 1 Drawing Sheet

(56) References Cited

U.S. PATENT DOCUMENTS

| | | | | |
|---|---|---|---|---|
| 4,985,532 A | * | 1/1991 | Pakull et al. | 528/190 |
| 5,344,916 A | | 9/1994 | Harris et al. | |
| 5,480,964 A | | 1/1996 | Harris et al. | |
| 5,580,950 A | | 12/1996 | Harris et al. | |
| 5,614,599 A | * | 3/1997 | Bales et al. | 525/461 |
| 5,804,634 A | * | 9/1998 | Umetsu et al. | 524/466 |
| 5,989,758 A | * | 11/1999 | Komatsu et al. | 430/20 |
| 6,046,300 A | * | 4/2000 | Umetsu et al. | 528/176 |
| 6,075,114 A | * | 6/2000 | Umetsu et al. | 528/272 |
| 6,610,219 B2 | | 8/2003 | McGinniss et al. | |
| 6,795,246 B2 | | 9/2004 | Yano et al. | |
| 6,853,424 B2 | | 2/2005 | Elman et al. | |
| 7,012,663 B2 | | 3/2006 | Ono et al. | |
| 7,052,747 B2 | | 5/2006 | Nishikouji et al. | |
| 7,087,682 B2 | * | 8/2006 | Tadros et al. | 525/437 |
| 7,270,858 B2 | | 9/2007 | Yamaoka et al. | |
| 7,462,381 B2 | | 12/2008 | Yoshimi et al. | |
| 7,494,689 B2 | | 2/2009 | Hayashi et al. | |
| 7,625,612 B2 | * | 12/2009 | Ohmori et al. | 428/1.3 |
| 2004/0021815 A1 | * | 2/2004 | Elman | 349/117 |
| 2004/0027521 A1 | * | 2/2004 | Elman et al. | 349/117 |
| 2004/0223103 A1 | * | 11/2004 | Elman | 349/117 |
| 2005/0096431 A1 | | 5/2005 | Fujii et al. | |
| 2006/0082708 A1 | * | 4/2006 | Nagase et al. | 349/124 |
| 2006/0177607 A1 | * | 8/2006 | Ohmori et al. | 428/1.31 |
| 2006/0229428 A1 | | 10/2006 | Shaikh et al. | |
| 2007/0273816 A1 | | 11/2007 | Kitagawa et al. | |
| 2009/0046228 A1 | * | 2/2009 | Takeda et al. | 349/118 |
| 2009/0116109 A1 | | 5/2009 | Konishi et al. | |
| 2010/0020279 A1 | | 1/2010 | Nagase et al. | |
| 2010/0159158 A1 | | 6/2010 | Shibata et al. | |
| 2010/0188749 A1 | * | 7/2010 | Hirayama et al. | 359/494 |
| 2010/0265579 A1 | | 10/2010 | Iida et al. | |
| 2010/0304110 A1 | * | 12/2010 | Iida et al. | 428/220 |
| 2010/0328772 A1 | * | 12/2010 | Hirayama et al. | 359/500 |
| 2011/0013278 A1 | * | 1/2011 | Hirayama et al. | 359/494 |
| 2011/0176092 A1 | * | 7/2011 | Iida et al. | 349/96 |
| 2012/0081785 A1 | * | 4/2012 | Iida et al. | 359/489.07 |

FOREIGN PATENT DOCUMENTS

| | | | |
|---|---|---|---|
| JP | 1-240517 A | | 9/1989 |
| JP | 3-014882 A | | 1/1991 |
| JP | 3-500412 A | | 1/1991 |
| JP | 3-122137 A | | 5/1991 |
| JP | 7-233249 A | | 9/1995 |
| JP | 8-134336 A | | 5/1996 |
| JP | 11-271529 A | | 10/1999 |
| JP | 2001-343529 A | | 12/2001 |
| JP | 2002-311240 A | | 10/2002 |
| JP | 3417949 B2 | | 6/2003 |
| JP | 2003-315538 A | | 11/2003 |
| JP | 2004-70329 A | | 3/2004 |
| JP | 3984277 B2 | | 10/2007 |
| JP | 2008-003559 A | | 1/2008 |
| JP | 2008-33285 A | | 2/2008 |
| JP | 2008-170514 A | | 7/2008 |
| JP | 2008-535977 A | | 9/2008 |
| KR | 2010-0093084 | * | 8/2010 |
| WO | 89/03380 A1 | | 4/1989 |
| WO | 94/24191 A1 | | 10/1994 |
| WO | 97/22649 A1 | | 6/1997 |
| WO | 01-37007 | | 5/2001 |
| WO | 2007/132816 A1 | | 11/2007 |

OTHER PUBLICATIONS

Japanese Office Action dated Dec. 21, 2012, issued in corresponding Japanese patent application No. 2009-100128, w/ English translation.

International Search Report of PCT/JP2009/051272, mailing date of Apr. 28, 2009.

Taiwanese Office Action dated Oct. 18, 2012, issued in correspondoing Taiwanese Patent Application No. 098103567 (Japanese Translation Only) 3 pages.

US Office Action dated Mar. 29, 2013, issued in corresponding U.S. Appl. No. 12/918,642.

* cited by examiner

OPTICAL FILM AND METHOD FOR PRODUCTION THEREOF

TECHNICAL FIELD

The invention relates to an optical film used for optical compensation or the like of liquid crystal displays, an optical laminate including the optical film, and methods for production thereof. The invention also relates to a polarizing plate using the optical film and/or the optical laminate and to an image display device such as a liquid crystal display, an organic electroluminescence (EL) display, or a plasma display panel (PDP), using the optical film and/or the optical laminate.

BACKGROUND ART

In conventional technologies, birefringent polymer materials have been used for optical compensation or the like of liquid crystal displays. Such optical compensation materials that are widely used include plastic films that have undergone stretching or the like so that they have birefringence. In recent years, an optical compensation material including a substrate coated with a polymer having high birefringence-producing capability, such as aromatic polyimide or aromatic polyester, has also been developed (see for example Patent Documents 1 and 2).

Such an aromatic polymer is characterized by having a high level of heat resistance and mechanical strength but tends to have low solubility in organic solvents. Therefore, an optical film mainly composed of such an aromatic polymer is generally formed by a process including the steps of dissolving the polymer in a high-polarity solvent, which therefore has high solubility, to form a solution, and then applying the solution to a metallic drum or metallic belt or a base film or the like and drying it to form a film. In such a film production method, however, since a choice of solvents capable of dissolving the polymer is limited, drying conditions may be restricted, or expensive equipment may be needed. Since the substrate used in the coating process has to be insoluble in the solvent, materials usable for the substrate are also limited. From these points of view, it has been demanded to develop a polymer that is soluble in a low-polarity solvent such as toluene and has birefringence-producing capability so that it can function as an optical compensation material.

In some cases, optical films for optical compensation of liquid crystal displays and so on need to allow the wavelength dispersion of birefringence to be controlled appropriately, as well as to have workability, heat resistance, mechanical strength, the ability to develop high birefringence, or the like. In some cases, for example, an optical film for compensation of the birefringence of a liquid crystal cell is required to have wavelength dispersion characteristics consistent with the wavelength dispersion of the birefringence of the liquid crystal cell. However, the wavelength dispersion characteristics of the birefringence vary from one liquid crystal cell to another, and therefore, the wavelength dispersion of the birefringence of the optical film for appropriate compensation must be adjusted for each type of liquid crystal cell.

LIST OF REFERENCES

Patent Document 1: the pamphlet of PCT International Publication No. WO94/24191

Patent Document 2: Japanese Patent Application Laid-Open (JP-A) No. 2004-070329

SUMMARY OF THE INVENTION

The wavelength dispersion of the birefringence of an optical film is a value inherent in the polymer constituting the optical film. In order to control the wavelength dispersion, therefore, the polymer structure itself should be modified. However, it is considered to be impractical to newly design a polymer for each type of liquid crystal cell. On the other hand, the retardation expressed by the product of birefringence and thickness has the additive property, and therefore, polymers having different wavelength dispersion characteristics may be used in combination so that the wavelength dispersion can be controlled. Examples of such a method using different polymers in combination include methods of laminating different polymer films. However, such methods tend to increase cost, because it is necessary to produce different films and to provide lamination means for laminating the films, such as an adhesive.

From these points of view, it is considered to be preferable to blend different polymers so that the wavelength dispersion can be controlled in a single optical film. However, when different polymers are blended, compatibility between the polymers must be taken into account as well as their solubility in a solvent. Specifically, since available combinations of compatible polymers are limited, the production of an optical film with a blend of different polymers is more likely to cause a problem such as low transparency or mechanical strength of the film.

In view of these conventional techniques, an object of the invention is to provide an optical film that makes it possible to control the wavelength dispersion, is capable of being used for optical compensation of liquid crystal displays and so on, and has transparency with a blend of different compatible polymers.

As a result of investigations, the inventors have made the invention based on the finding that polyesters having specific structures are compatible with each other and make it possible to control the wavelength dispersion of birefringence. Specifically, the invention is directed to an optical film including a polymer having a repeating unit represented by Formula (I) below and another polymer having a repeating unit represented by Formula (II) below.

[Formula (I)]

In Formula (I) above, $A_1$, $B_1$, $D_1$, and $E_1$ each represent a substituent on the benzene ring, and $a_1$, $b_1$, $d_1$, and $e_1$ each represent the number (an integer of 0 to 4) of the corresponding substituents represented by each of $A_1$, $B_1$, $D_1$, and $E_1$. $A_1$, $B_1$, $D_1$, and $E_1$ each independently represent hydrogen, halogen, an alkyl group of 1 to 6 carbon atoms, or a substituted or unsubstituted aryl group. $X_1$ represents a single covalent bond, an unsaturated double bond, an unsaturated triple bond, or at least one atom or group selected from the group consisting of a $CH_2$ group, a CHR group, a $CR_2$ group, a $C(CZ_3)_2$ group, a CO group, an O atom, a S atom, an $SO_2$ group, an $Si(CH_2CH_3)_2$ group, and an $N(CH_3)$ group, wherein R each independently represent a straight-chain or branched alkyl group of 1 to 6 carbon atoms or a substituted or unsubstituted aryl group, and Z represents halogen, and $p_1$ and $q_1$ each represent an integer of 1 to 3.

[Formula (II)]

In Formula (II) above, $A_2$, $D_2$ and $E_2$ each represent a substituent, and $a_2$, $d_2$ and $e_2$ each represent the number (an integer of 0 to 4) of the corresponding substituents represented by each of $A_2$, $D_2$ and $E_2$. $A_2$, $D_2$ and $E_2$ each independently represent hydrogen, halogen, an alkyl group of 1 to 6 carbon atoms, or a substituted or unsubstituted aryl group. $X_2$ represents a single covalent bond, an unsaturated double bond, an unsaturated triple bond, or at least one atom or group selected from the group consisting of a $CH_2$ group, a CHR group, a $CR_2$ group, a $C(CZ_3)_2$ group, a CO group, an O atom, a S atom, an $SO_2$ group, an $Si(CH_2CH_3)_2$ group, and an $N(CH_3)$ group, wherein R each independently represent a straight-chain or branched alkyl group of 1 to 6 carbon atoms or a substituted or unsubstituted aryl group, and Z represents halogen, and $p_2$ and $q_2$ each represent an integer of 1 to 3.

In the optical film of the invention, Formula (I) is preferably Formula (III) below, and Formula (II) is preferably Formula (IV) below.

[Formula (III)]

In Formula (III) above, $A_1$ and $B_1$, and $a_1$ and $b_1$ each have the same meaning as in Formula (I). $R^1$ and $R^2$ each independently represent a straight-chain or branched alkyl group of 1 to 10 carbon atoms or a substituted or unsubstituted aryl group, $R^3$ to $R^6$ each independently represent a hydrogen atom, a halogen atom, a straight-chain or branched alkyl group of 1 to 6 carbon atoms, a cycloalkyl group of 5 to 10 carbon atoms, or a substituted or unsubstituted aryl group (provided that at least one of $R^3$ to $R^6$ is not a hydrogen atom.)

[Formula (IV)]

In Formula (IV) above, $A_2$ and $a_2$ each have the same meaning as in Formula (II). $R^7$ and $R^8$ each independently represent a straight-chain or branched alkyl group of 1 to 10 carbon atoms or a substituted or unsubstituted aryl group, $R^9$ to $R^{12}$ each independently represent a hydrogen atom, a halogen atom, a straight-chain or branched alkyl group of 1 to 6 carbon atoms, a cycloalkyl group of 5 to 10 carbon atoms, or a substituted or unsubstituted aryl group (provided that at least one of $R^9$ to $R^{12}$ is not a hydrogen atom.)

In an embodiment of the invention, $R^7$ in Formula (IV) is preferably a methyl group, and $R^8$ in Formula (IV) is preferably a straight-chain or branched alkyl group of 2 to 4 carbon atoms. Preferably, $R^9$ to $R^{12}$ in Formula (IV) are each independently a straight-chain or branched alkyl group of 1 to 4 carbon atoms.

$R^1$ in Formula (III) is preferably a methyl group, and $R^2$ in Formula (III) is preferably a straight-chain or branched alkyl group of 2 to 4 carbon atoms. Preferably, $R^3$ to $R^6$ in Formula (III) are each independently a straight-chain or branched alkyl group of 1 to 4 carbon atoms.

In the optical film of the invention, the polymer having the repeating unit represented by Formula (I) and the polymer having the repeating unit represented by Formula (II) are preferably in a weight ratio of 1:99 to 99:1.

The optical film of the invention preferably has a thickness of 20 μm or less.

The optical film of the invention preferably has a ratio (D=Rth(450)/Rth(550)) of the retardation (Rth(450)) in the thickness direction at a wavelength of 450 nm to the retardation (Rth(550)) in the thickness direction at a wavelength of 550 nm in the range of 1.02 to 2.00, more preferably 1.04 to 1.18, and even more preferably 1.06 to 1.16. The optical film of the invention preferably has a haze of 1.0% or less. The refractive index nz in the film thickness direction is preferably lower than the maximum nx of the in-plane refractive index of the film.

In an embodiment, a method for producing the optical film of the invention preferably includes the steps of: preparing a solution containing the polymer having the repeating unit represented by Formula (I), the polymer having the repeating unit represented by Formula (II), and a solvent; applying the solution to the surface of a base material; and drying the applied solution.

The invention is also directed to a polarizing plate including the optical film and a polarizer and to an image display including at least one of the optical film and the polarizing plate.

The polymers having the repeating units represented by Formulae (I) and (II), respectively, both have high solubility in a solvent and a high ability to develop birefringence and are compatible with each other. Therefore, the optical film of the invention has high transparency, and can exhibit a desired retardation even when it is thin. The use of a combination of the polymers having different wavelength dispersions also makes it possible to properly control the wavelength dispersion of birefringence only by changing the ratio between the contents of the polymers. Therefore, optical compensation can be properly achieved even for different types of liquid crystal cells.

DESCRIPTION OF EMBODIMENTS

The optical film of the invention includes a polymer comprising a repeating unit represented by Formula (I) below and a polymer comprising a repeating unit represented by Formula (II) below.

The polymers having repeating units represented by Formula (I) and (II), respectively, are described below one by one.

First, a description is given of the polymer having the repeating unit represented by Formula (I). In Formula (I), $A_1$, $B_1$, $D_1$, and $E_1$ each represent a substituent on the benzene ring, and $a_1$, $b_1$, $d_1$, and $e_1$ each represent the number (an integer of 0 to 4) of the corresponding substituents represented by each of $A_1$, $B_1$, $D_1$, and $E_1$. $A_1$, $B_1$, $D_1$, and $E_1$ each independently represent hydrogen, halogen, an alkyl group of 1 to 6 carbon atoms, or a substituted or unsubstituted aryl group. $X_1$ represents a single covalent bond, an unsaturated double bond, an unsaturated triple bond, or at least one atom or group selected from the group consisting of a $CH_2$ group, a CHR group, a $CR_2$ group, a $C(CZ_3)_2$ group, a CO group, an O atom, a S atom, an $SO_2$ group, an $Si(CH_2CH_3)_2$ group, and an $N(CH_3)$ group, wherein R each independently represent a straight-chain or branched alkyl group of 1 to 6 carbon atoms or a substituted or unsubstituted aryl group, and Z represents halogen, and $p_1$ and $q_1$ each represent an integer of 1 to 3.

In view of the solubility and birefringence developing ability of the polymer, the repeating unit represented by Formula (I) in which $p_1=q_1=1$, and $X_1$ is a $CR_2$ group, namely, a straight-chain or branched alkylene group, is preferably used. Such a monomer unit that is preferably used may be represented by Formula (III) below.

[Formula (III)]

In Formula (III) above, $A_1$ and $B_1$, and $a_1$ and $b_1$ each have the same meaning as in Formula (I). $R^1$ and $R^2$ each independently represent a straight-chain or branched alkyl group of 1 to 10 carbon atoms or a substituted or unsubstituted aryl group, $R^3$ to $R^6$ each independently represent a hydrogen atom, a halogen atom, a straight-chain or branched alkyl group of 1 to 6 carbon atoms, a cycloalkyl group of 5 to 10 carbon atoms, or a substituted or unsubstituted aryl group (provided that at least one of $R^3$ to $R^6$ is not a hydrogen atom).

When any one of $A_1$, $B_1$ and $R^1$ to $R^6$ is an unsubstituted aryl group, the unsubstituted aryl group may be a phenyl group, a biphenyl group, a terphenyl group, a naphthyl group, a binaphthyl group, a triphenylphenyl group, or the like. When any one of $A_1$, $B_1$, $R^1$ and $R^2$ is a substituted aryl group, the substituted aryl group may be derived from the unsubstituted aryl group by replacing one or more hydrogen atoms by a straight-chain or branched alkyl group of 1 to 10 carbon atoms, a straight-chain or branched alkoxy group of 1 to 10 carbon atoms, a nitro group, an amino group, a silyl group, halogen, a halogenated alkyl group, a phenyl group, or the like. When any one of $R^1$ to $R^6$ is a halogen atom, the halogen atom may be fluorine, chlorine, bromine, iodine, or the like. Further, the cycloalkyl group of 5 to 10 carbon atoms for $R^3$ to $R^6$ may have one or more straight-chain or branched alkyl groups of 1 to 5 carbon atoms on the ring. Specific examples of the cycloalkyl group include a cyclopentyl group, a cyclohexyl group, a cycloheptyl group, a cyclooctyl group, a cyclononyl group, a cyclodecyl group, and a cycloalkyl group of 5 to 10 carbon atoms having a substituent such as a methyl group, an n-propyl group, an isopropyl group, an n-butyl group, an isobutyl group, or a tert-butyl group on the ring of any of the above.

In Formula (III), $R^1$ and $R^2$ are preferably each independently a straight-chain or branched alkyl group of 1 to 4 carbon atoms. Among these, $R^1$ is preferably a methyl group, and $R^2$ is preferably a straight-chain or branched alkyl group of 2 to 4 carbon atoms, and $R^2$ is particularly preferably an ethyl group or an isobutyl group. If $R^1$ and/or $R^2$ are/is an alkyl group of too many carbon atoms, birefringence may be less likely to be produced or heat resistance (glass transition temperature) may be reduced in some cases. Further, if the number of the carbon atoms in each of $R^1$ and $R^2$ are too small, poor solubility in solvents may be provided in some cases.

Further, in Formula (III), $R^3$ and $R^5$ are preferably each independently a straight-chain or branched alkyl group of 1 to 4 carbon atoms, and $R^4$ and $R^6$ are preferably each independently a hydrogen atom or a straight-chain or branched alkyl group of 1 to 4 carbon atoms. Among these, all of $R^3$ to $R^6$ are preferably a straight-chain or branched alkyl group of 1 to 4 carbon atoms, and in particular, all of $R^3$ to $R^6$ are preferably methyl groups.

The polymer having specific substituents for $R^1$ to $R^6$ as described above has high solubility in a solvent. Although it is not clear why the solubility varies with the number of the carbon atoms in the substituents, it can be considered that when the phenyl group has a certain substituent, steric hindrance is generated to prevent the stacking of the aromatic rings, which contributes to the solubility.

Next, a description is given of the polymer having the repeating unit represented by Formula (II). In Formula (II), $A_2$, $D_2$ and $E_2$ each represent a substituent and have the same meaning as $A_1$, $D_1$ and $E_1$ in Formula (I), respectively. In Formula (II), $a_2$, $d_2$, and $e_2$ each represent the number (an integer of 0 to 4) of the corresponding substituents represented by each of $A_2$, $D_2$ and $E_2$. $X_2$ has the same meaning as $X_1$ in Formula (I), $p_2$ and $q_2$ each represent an integer of 1 to 3, and $r_2$ represents 1 or 2.

In view of the solubility and birefringence developing ability of the polymer, the repeating unit represented by Formula (II) in which $p_2=q_2=1$, and $X_2$ is a $CR_2$ group, namely, a straight-chain or branched alkylene group, is preferably used. Such a monomer unit that is preferably used may be represented by Formula (IV) or (V) below.

[Formula (IV)]

[Formula (V)]

(V)

In Formulae (IV) and (V) above, $A_2$ and $a_2$ each have the same meaning as in Formula (II), and $B_2$ and $b_2$ each have the same meaning as for $A_2$ and $a_2$. $R^7$ to $R^{12}$ each have the same meaning as for $R^1$ to $R^6$ in Formula (III).

The ratio of the birefringence at a wavelength of 450 nm to the birefringence at a wavelength of 550 nm (represented by D=Rth(450)/Rth(550)) of the polymer having the repeating unit represented by Formula (IV) tends to be smaller than that of the polymer having the repeating unit represented by Formula (V). For wide-range control of the wavelength dispersion of the birefringence of the optical film, therefore, the polymer having the repeating unit represented by Formula (IV) is preferably used.

When the polymer having the repeating unit of Formula (IV) is used, the polymer preferably has a terephthalic acid-derived structure represented by Formula (VI) below or is preferably a copolymer represented by Formula (VII) below having a terephthalic acid-derived structure and an isophthalic acid-derived structure. In particular, the copolymer having the structure represented by Formula (VII) below is preferred in order to increase the solubility in a general-purpose solvent.

In the polyester represented by Formula (VI), the content of the terephthalic acid derivative-derived structure in the acid components, namely the l/(l+m) value, is preferably 0.3 or more, more preferably 0.5 or more, even more preferably 0.6 or more. When the l/(l+m) value is too small, heat resistance can be insufficient, or birefringence-producing capability can be reduced, although high solubility can be provided.

While the polymers having the repeating units represented by Formula (I) and (II), respectively, have been described, these ester polymers may also contain an additional repeating unit other than the above. The content of the structure of Formula (I) or (II) in each ester polymer may be any value in the range where the polymer can have solubility and the ability to develop birefringence. In order to control the wavelength dispersion by blending the two polymers, the content of the structure of Formula (I) in the polymer having the repeating unit of Formula (I) is preferably 30% by mole or more, more preferably 50% by mole or more, and even more preferably 70% by mole or more. The content of the structure of Formula (II) in the polymer having the repeating unit of Formula (II) is preferably 50% by mole or more, more preferably 70% by mole or more, and even more preferably 80%

[Formula (VI)]

(VI)

[Formula (VII)]

(VII)

Note that in Formulae (VI) and (VII), $A_2$, $a_2$, and $R^7$ to $R^{12}$ each have the same meaning as defined in Formula (IV); $A'_2$, $a'_2$, and $R'^7$ to $R'^{12}$ have the same meaning as defined for $A_2$, $a_2$, and $R^7$ to $R^{12}$. l and m each represent a monomer ratio (molar ratio). The polymer having the structure represented by Formula (IV) may have any sequence with no particular limitation and may be any of a block copolymer and a random copolymer, although block copolymers are suggested by Formula (VII) for convenience of illustration.

by mole or more. When each polymer has a specific monomer ratio as described above, a difference is made between the wavelength dispersion of the birefringence of the polymer having the repeating unit of Formula (I) and that of Formula (II), which makes it possible to properly control the wavelength dispersion of the optical film containing both polymers.

The polymers having the repeating unit of Formula (I) and Formula (II) each preferably have a weight-average molecular weight (Mw) of 3,000 or more, more preferably from 5,000 to 1,000,000, even more preferably from 10,000 to 500,000, most preferably from 50,000 to 350,000. When the molecular weight is too low, the film strength can be insufficient, or optical properties can significantly change upon exposure to a high-temperature environment. When the molecular weight is too high, the productivity of the optical film can be reduced due to a reduction in the solubility in solvents, or the like.

The glass transition temperature of each of the polymers having the repeating unit of Formula (I) and Formula (II) is preferably, but not limited to, 100° C. or more, more preferably 120° C. or more, even more preferably 150° C. or more, in view of the heat resistance of the optical film. In view of formability, workability such as stretchability, the glass transition temperature is also preferably 300° C. or less, more preferably 250° C. or less.

In the optical film of the invention, the polymer having the repeating unit represented by Formula (I) is compatible with the polymer having the repeating unit represented by Formula (II). Therefore, the ratio between the contents of both polymers may be freely selected. For example, the weight ratio between them may be controlled in the range of 1:99 to 99:1, preferably 5:95 to 95:5, and more preferably 10:90 to 90:10 so that the desired wavelength dispersion can be obtained.

The ratio of the retardation Rth(450) in the thickness direction at a wavelength of 450 nm to the retardation Rth(550) in the thickness direction at a wavelength of 550 nm (D=Rth(450)/Rth(550)) of the polymer having the repeating unit represented by Formula (I) tends to be larger than that of the polymer having the repeating unit represented by Formula (II). Therefore, a relatively high content of the polymer having the repeating unit represented by Formula (I) tends to make Rth(450)/Rth(550) relatively high, while a relatively high content of the polymer having the repeating unit represented by Formula (II) tends to make Rth(450)/Rth(550) relatively low. In an embodiment of the invention, the Rth(450)/Rth(550) ratio of the optical film is preferably from 1.02 to 2.00, more preferably from 1.04 to 1.18, and even more preferably from 1.06 to 1.16.

At a measurement wavelength, the retardation Rth in the thickness direction may be expressed by the product ($\Delta nxz \times d$) of the birefringence ($\Delta nxz = nx - nz$) in the thickness direction and the thickness (d), wherein nx represents the refractive index in a direction where the in-plane refractive index of the optical film is maximum, namely, the refractive index in the slow axis direction, and nz represents the refractive index in the thickness direction.

In an embodiment of the invention, the refractive index nz of the optical film in the thickness direction is preferably smaller than the maximum nx of the in-plane refractive index of the optical film. The birefringence in the thickness direction at a wavelength of 550 nm is preferably 0.01 or more, more preferably from 0.012 to 0.07, and even more preferably from 0.015 to 0.055. The optical film having such optical properties is suitable for use in optical compensation or the like of liquid crystal displays.

The optical film of the invention may have any thickness, and it may be a self-supporting film or a thin coating film. The ability of the ester polymers to develop birefringence is high. Therefore, even in the form of a coating film with a thickness of 20 μm or less, the ester polymers can form an optical film having a retardation enough for applications such as optical compensation of liquid crystal displays.

When the optical film is used for such applications as optical compensation of liquid crystal displays, the optical film preferably has high transparency and a haze of 1.0% or less. The haze of the optical film of the invention can be kept low, because the ester polymers are compatible with each other.

Next, a description is given of examples of methods for producing the polymers used to form the optical film of the invention. The ester polymers having the repeating units of Formulae (I) and (II), respectively, may be produced using any known methods. In general, they may be obtained by polycondensation of the corresponding bisphenol compound and dicarboxylic acid compound or derivatives thereof.

A variety of condensation polymerization methods are generally known, such as melt condensation polymerization methods by removal of acetic acid, melt condensation polymerization methods by removal of phenol, dehydrochlorination homogeneous polymerization methods that are performed in an organic solvent system capable of dissolving the polymer and use the dicarboxylic acid compound in the form of an acid dichloride and an organic base, interfacial condensation polymerization methods in which dicarboxylic acid dichloride and bisphenol are polymerized in a two-phase system of an aqueous alkali solution and a water-immiscible organic solvent, and direct condensation polymerization methods in which a bisphenol compound and a dicarboxylic acid are directly used with a condensing agent to form an active intermediate in the reaction system. In particular, the ester-based polymer is preferably produced by interfacial condensation polymerization, in view of transparency, heat resistance, and high-molecular-weight production.

When the ester-based polymer is produced by interfacial condensation polymerization, monomers (bisphenol and dicarboxylic acid chloride), an organic solvent, an alkali, a catalyst, and so on may be used.

When the polyester having the structure of Formula (I) is obtained, the dicarboxylic acid chloride may be 4,4'-stilbenedicarboxylic acid chloride or a derivative of 4,4'-stilbenedicarboxylic acid chloride in which a typical substituent for $A_1$ or $B_1$ in Formula (I) or (III) as listed above is attached to the aromatic ring. When the polyester having the structure of Formula (II) is obtained, the dicarboxylic acid chloride to be used may be terephthalic acid chloride, isophthalic acid chloride, 4,4'-biphenyldicarboxylic acid chloride, or a derivative of the above compounds in which a typical substituent for $A_2$, $A_2$, or $B_2$ in Formula (II), (IV), (V), (VI) or (VII) as listed above is attached to the aromatic ring.

Examples of the bisphenol include 2,2-bis(3-methyl-4-hydroxyphenyl)propane, 2,2-bis(3,5-dimethyl-4-hydroxyphenyl)propane, 2,2-bis(3-methyl-4-hydroxyphenyl)butane, 2,2-bis(3-methyl-4-hydroxyphenyl)-4-methylpentane, 2,2-bis(3-sec-butyl-4-hydroxyphenyl)propane, 2,2-bis(3-cyclohexyl-4-hydroxyphenyl)propane, 2,2-bis(4-hydroxyphenyl)butane, 2,2-bis(4-hydroxyphenyl)-4-methylpentane, 3,3-bis(4-hydroxyphenyl)pentane, 2,2-bis(4-hydroxyphenyl)hexane, 1,1-bis(4-hydroxyphenyl)-1-phenylmethane, and bis(4-hydroxyphenyl)diphenylmethane. Furthermore, bisphenols even other than the above diols may also be produced as monomers for the polyester by known methods of allowing phenol derivatives to react with corresponding ketones in the presence of an acid catalyst.

The organic solvent used for the polymerization reaction is preferably, but not limited to, one that is less miscible with water and capable of dissolving the ester-based polymer, such as a halide solvent such as dichloromethane, chloroform, or 1,2-dichloroethane, or anisole. Two or more of these solvents may be used in the form of a mixture.

The alkali to be used may be sodium hydroxide, potassium hydroxide, lithium hydroxide, or the like. The amount of the alkali used is generally from 2 to 5 times by mole (1 to 2.5 molar equivalents) the amount of the bisphenol monomer.

The catalyst that may be used is preferably a phase transfer catalyst such as a quaternary ammonium salt such as tetrabutylammonium bromide, trioctylmethylammonium chloride, or benzyltriethylammonium chloride; a quaternary phosphonium salt such as tetraphenylphosphonium chloride or triphenylmethylphosphonium chloride; or a polyethylene oxide compound such as polyethylene glycol, polyethylene glycol monomethyl ether, polyethylene glycol dimethyl ether, dibenzo-18-crown-6, or dicyclohexyl-18-crown-6. In particular, tetraalkylammonium halides are preferably used in view of handleability such as removability of the catalyst after the reaction. If necessary, any other additive such as an antioxidant or a molecular weight modifier may also be used.

Methods for controlling the molecular weight of the ester-based polymer include a method of changing the functional group ratio between the hydroxyl group and the carboxyl group for polymerization and a method of adding a monofunctional substance as a molecular weight modifier in the polymerization process. Examples of such a monofunctional substance used as a molecular weight modifier include monofunctional phenols such as phenol, cresol, and p-tert-butylphenol; monofunctional chlorides such as benzoic acid chloride, methanesulfonyl chloride, and phenyl chloroformate; and monofunctional alcohols such as methanol, ethanol, n-propanol, isopropanol, n-butanol, pentanol, hexanol, dodecyl alcohol, stearyl alcohol, benzyl alcohol, and phenethyl alcohol. After the polymerization reaction, a monofunctional acid chloride may be allowed to react so that the terminal phenol can be sealed. The terminal sealing is preferably used, because it can prevent oxidative coloration of the phenol. An antioxidant may also be concomitantly used in the polymerization process.

When an interfacial condensation polymerization reaction is used, the polymerization reaction yields a mixture of an aqueous phase and an organic phase, which contains not only a polymer, an organic solvent and water but also a catalyst and impurities such as remaining monomers. When interfacial condensation polymerization is performed with a halide solvent, water-soluble impurities are generally removed by a method of washing with water that includes repeating a separation process including separation and removal of the aqueous phase. After washing with water, if necessary, reprecipitation may be performed using a water-miscible organic solvent serving as a poor solvent for the polymer, such as acetone or methanol. The reprecipitation with the water-miscible organic solvent allows dehydration and desolvation so that a powder can be produced and that hydrophobic impurities such as bisphenol compounds can be reduced in many cases.

A solvent that is less compatible with water and cannot dissolve 0.5% by weight or more of the ester-based polymer is preferably used as a water-immiscible organic solvent serving as a poor solvent for the polymer. The boiling point of the solvent is preferably 120° C. or less so that the solvent can be easily removed by heat drying. Preferred examples of such a solvent include hydrocarbons such as cyclohexane and isophorone; and alcohols such as methanol, ethanol, propanol, and isopropyl alcohol, but preferred examples are variable, because the solubility depends on the polymer type.

The concentration of the monomers added for the interfacial condensation polymerization and the concentration of the polymer for post treatment are preferably set high so that high productivity can be provided. The interfacial condensation polymerization preferably has a concentration such that the amount of the polymer can be 1% by weight or more, preferably 3% by weight or more, more preferably 5% by weight or more, based on the total amount of the liquid including the aqueous phase and the organic phase obtained after the reaction.

The reaction temperature is preferably, but not limited to, from −5° C. to 50° C., more preferably from 5° C. to 35° C., particularly preferably from 10° C. to 30° C. or near room temperature. When the reaction temperature falls within the range, the viscosity and the temperature can be easily controlled during the reaction, and adverse reactions such as hydrolysis and oxidative coloration can be reduced.

In order to prevent side reactions, the reaction temperature may be previously set low in consideration of generation of heat associated with the polymerization reaction. In order to allow the reaction to proceed gradually, an alkali solution or dicarboxylic acid dichloride may be gradually added, or the solution may be added dropwise. In order to prevent oxidative coloration, the reaction is preferably allowed to proceed under an inert gas atmosphere such as nitrogen.

After the addition of the alkali solution and dicarboxylic acid dichloride, the reaction time is generally from 10 minutes to 10 hours, preferably 30 minutes to 5 hours, more preferably 1 to 4 hours, while it varies with the type of the monomers, the amount of the alkali used, or the concentration of the alkali.

After the interfacial condensation polymerization reaction is completed, the resulting ester-based polymer may be subjected to separation and washing with water and then used in the form of a solution without modification or formed into a powder with a poor solvent.

When the ester-based polymer is produced by dehydrochlorination homogeneous polymerization, monomers (bisphenol and dicarboxylic acid chloride), an organic solvent, an amine compound and the like may be used.

The dicarboxylic acid chloride and the bisphenol to be used may each be the same as that described above for interfacial condensation polymerization. Further, the organic solvent is preferably a solvent capable of dissolving the ester-based polymer, and, therefore, a halide solvent such as dichloromethane, chloroform, and 1,2-dichloroethane, or anisole or the like is preferably used as described above. Furthermore, in the homogeneous polymerization method, the solvent may also be miscible with water, and therefore, besides the above solvents, a ketone solvent such as methyl ethyl ketone, or the like is preferably used.

The amine compound is used as an acid acceptor to promote the reaction. The amine compound to be used is preferably a tertiary amine such as trimethylamine, triethylamine, tri-n-butylamine, trihexylamine, tridodecylamine, N,N-dimethylcyclohexylamine, pyridine, a pyridine derivative such as 3-methylpyridine, quinoline, and dimethylaniline. Further, if necessary, any other additive such as an antioxidant or a molecular weight modifier may be used for the reaction system.

When a dehydrochlorination homogeneous polymerization method is used, the polymerization reaction yields a solution of the polymer in the solvent, which contains not only the polymer and the organic solvent but also impurities such as the amine compound and the remaining monomers. Such impurities may be removed by repeating separation and performing washing with water in the same manner as in the interfacial condensation polymerization process. Thereafter, if necessary, reprecipitation with a poor solvent may be performed so that the product can be recovered in the form of a powder.

Further, in the dehydrochlorination homogeneous polymerization method, the same conditions as those described for the interfacial condensation polymerization are preferably used with respect to the concentration of the monomers added, the polymer concentration during treatment, the reaction temperature, the reaction time, and the like.

Next, a description is given of methods for producing the optical film of the invention with the ester polymers. The optical film of the invention may be obtained by a known method such as a coating method from a solution or a melt extrusion method using the polymer having the repeating unit represented by Formula (I) and the polymer having the repeating unit represented by Formula (II). In view of the smoothness, uniform optical properties or birefringence developing ability of the optical film, the film is preferably produced by a coating method from a solution.

When the film is produced from a solution by a coating method, the process may include the steps of preparing a solution comprising the ester polymers mentioned above and a solvent, applying the solution to a surface of a polymer substrate, and drying the applied solution. Going through these steps, a film placed on and bonded to the substrate is formed.

Any appropriate solvent capable of dissolving the ester-based polymer may be selected for the solution depending on the type of the polymer. Examples of such a solvent include chloroform, dichloromethane, toluene, xylene, cyclohexanone, cyclopentanone, methyl isobutyl ketone, and ethyl acetate. One or more of these solvents may be used alone or in any combination. A poor solvent may also be added, as long as the ester-based polymer can be dissolved.

In general, the solubility of polyesters in solvents is relatively low. Therefore, polyesters tend to be less soluble in solvents other than environmentally-loading halogenated solvents such as methylene chloride and chloroform and high boiling point polar solvents such as dimethylformamide (DMF) and dimethylacetamide (DMAc). If a halogenated solvent, DMF, DMAc, or the like having high solubility is used to dissolve ester-based polymers, it may also dissolve substrates used in the process of forming optical films by coating. Therefore, if a solvent having high solubility is used, substrates used in the process of forming optical films by coating are limited to those having high solvent resistance.

The polymers having the repeating units represented by Formulae (I) and (II) are soluble in toluene, xylene, cyclohexanone, cyclopentanone, methyl isobutyl ketone, ethyl acetate, or the like. Therefore, the use of these solvents has the advantage that the scope of selection of available base materials can be broadened. The use of toluene or ethyl acetate as the solvent is also preferred, because the energy required to evaporate the solvent is small.

Further, the solution may also contain an additional resin other than the polymer having the repeating unit represented by Formula (I) or (II) as long as the birefringence-producing capability or transparency is not significantly reduced. Examples of the additional resin include various types of general-purpose resins, engineering plastics, thermoplastic resins, and thermosetting resins.

As described above, when a resin or the like other than the polymer having the repeating unit represented by Formulae (I) or (II) is added to the solution, the added amount thereof is preferably 0 to 20 parts by weight, and more preferably 0 to 15 parts by weight, based on 100 parts by weight of the ester-based polymer.

Various types of additives that meet the purpose of each preparation step (such as an antidegradant, an anti-ultraviolet agent, an optical anisotropy-adjusting agent, a releasing accelerator, a plasticizer, an infrared-absorbing agent, and a filler) may be added to the solution. They may be solid or oily and therefore a melting point or a boiling point thereof is not particularly limited. The additive is preferably added in an amount of 0 to 20 parts by weight, based on 100 parts by weight of the ester polymer.

For example, the concentration of the polymer in the solution is preferably, but not limited to, from 3 to 40 by weight, more preferably from 5 to 35 by weight, even more preferably from 10 to 30 by weight, in order to make the viscosity of the solution suitable for coating.

The optical film may be obtained by the steps of applying the solution to a substrate and appropriately drying the coating. The substrate to be used is typically, but not limited to, an endless substrate such as an endless belt or a drum-roller, or a finite-length substrate such as a polymer film. When the optical film of the invention is self-supporting, any of the endless substrate and the finite-length substrate may be used. The term "self-supporting" means that it is possible to handle the film even when the film is separated from the substrate, generally in a case where the film has a thickness of about 15 to 500 µm, more preferably about 20 to 300 µm. When the film has a thickness exceeding the range, too large thickness can cause problems with mass production, such as long time and high energy necessary for evaporation of the solvent and difficulty in obtaining uniform thickness.

When the optical film of the invention has a thickness of less than the above range, specifically about 1 to 20 µm or 2 to 15 µm, the finite-length substrate is preferably used. Methods using an endless substrate such as an endless belt or a drum-roller require the steps of separating the optical film from the substrate and transporting the film, and therefore are generally not suitable for the production of non-self-supporting films. In such a case, such an infinite-length substrate as a glass plate or a polymer film should be used so that the optical film of the invention can be formed as a coating film on the substrate. The term "optical film" used in the description and claims encompasses not only a self-supporting film but also a non-self-supporting coating film.

Among the infinite-length substrates, the polymer substrate is preferably used in view of handleability. Examples of the polymer substrate include polymer films made of a transparent polymer such as a polyester-based polymer such as polyethylene terephthalate or polyethylene naphthalate, a cellulose-based polymer such as diacetylcellulose or triacetylcellulose, a polycarbonate polymer, an acrylic polymer such as poly(methyl methacrylate), a styrene-based polymer such as polystyrene or an acrylonitrile-styrene copolymer, an olefin-based polymer such as polyethylene, polypropylene, a cyclic or norbornene structure-containing polyolefin, or an ethylene-propylene copolymer, a vinyl chloride-based polymer, an amide-based polymer such as nylon or an aromatic polyamide, an imide-based polymer, a sulfone-based polymer, a polyethersulfone-based polymer, a polyetheretherketone-based polymer, a polyphenylene sulfide-based polymer, a vinyl alcohol-based polymer, a vinylidene chloride-based polymer, a vinyl butyral-based polymer, an acrylate-based polymer, a polyoxymethylene-based polymer, or an epoxy-based polymer, or any blend thereof.

The polymer substrate may be a polymer film alone or a laminate of a polymer film and a layer or layers formed thereon, such as an anchor coat layer or an antistatic layer. In addition, a film that has undergone corona treatment, plasma treatment, saponification, or the like so as to have improved adhesive properties, may also be used. An optically functional film such as the reflective polarizing plate disclosed in Japanese Patent Application National Publication (Laid-Open) No. 09-506837 (U.S. Pat. No. 6,804,058) may also be used as the substrate.

In an embodiment of the invention, since the ester-based polymer has high solubility such that a low-polarity solvent such as toluene can be used to form a solution, a film mainly composed of an acrylic or olefin polymer that generally has low solvent resistance may also be used as the substrate.

Examples of the coating method include spin coating, roll coating method, flow coating method, printing method, dip coating method, film casting method, bar coating method, and gravure printing method. If necessary, multilayer coating may also be used in the coating process.

The solution applied to the substrate is then dried to form an optical film on the substrate. Examples of the drying method include natural drying and drying by heating. The drying conditions may be appropriately determined depending on the type of the solvent, the type of the polymer, the concentration of the polymer, or the like. For example, the drying temperature is generally from 25° C. to 300° C., preferably from 50° C. to 200° C., particularly preferably from 60° C. to 180° C. Note that the drying may be performed at a constant temperature or performed while the temperature is gradually raised or lowered. The drying time is also not particularly limited. The solidifying time is generally from 10 seconds to 60 minutes, preferably from 30 seconds to 30 minutes. Further, when the optical film is self-supporting, it may be temporarily separated from the support and then dried.

As described above, the optical film of the invention may be any of a relatively thick, self-supporting film and a relatively thin, non-self-supporting, coating film. Since the polymers used to form the optical film have a high ability to develop birefringence, the optical film is preferably used in the form of a coating film. As described above, such a coating film may be produced by applying a solution of the ester polymers to a base material and drying the solution, so that the coating film may be used in the form of an optical laminate, in which the optical film and the base material are laminated and bonded to each other, or may be used as it is to form a polarizing plate, an image display, or the like.

The polymers having the repeating units represented by Formulae (I) and (II), respectively, have an in-plane orientation. Therefore, only a coating film of the polymers has a certain birefringence in the thickness direction, and only applying a solution and drying it can produce a birefringence in the thickness direction. Therefore, the coating film can function as a so-called negative C plate, which has a refractive index anisotropy of nx≈ny>nz. In addition, an optical film having not only a birefringence in the thickness direction but also an in-plane birefringence (Δnxy=nx−ny) and a refractive index anisotropy of nx>ny>nz can also be produced by controlling the coating conditions or stretching conditions. In this context, ny is the refractive index in a direction where the in-plane refractive index is minimum, namely, in the fast axis direction.

Figure 1:
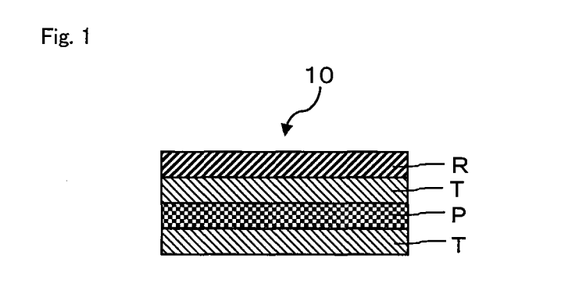
FIG. 1 is a sectional view schematically illustrating an example of the structure of the polarizing plate of the invention.
Figure 2:
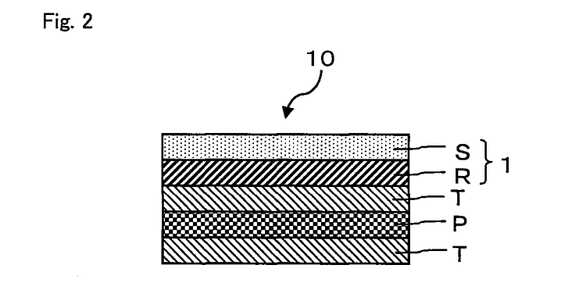
FIG. 2 is a sectional view schematically illustrating an example of the structure of the polarizing plate of the invention.

Next, the polarizing plate of the invention is described below. The polarizing plate of the invention is an optical compensation function-carrying polarizing plate having the optical film of the invention. Such a polarizing plate may have any structure, as long as it includes the optical film and a polarizer. As shown in FIG. 1, for example, the polarizing plate may be configured to include a polarizer P, transparent protective films T placed on both sides of the polarizer P, and the optical film of the invention R placed on the surface of one of the transparent protective films T. Note that when the optical laminate 1 includes a substrate S and the optical film R placed on and bonded to the substrate S is used, any of the surfaces of the optical film R and the substrate S may face the transparent protective film, but the optical film of the invention R preferably faces the transparent protective film T as shown in FIG. 2.

Further, the transparent protective film may be placed on both or one side of the polarizer. When placed on both sides, for example, the transparent protective films used may be of the same type or different types.

Figure 3:
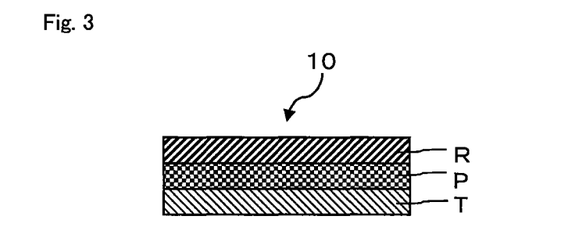
FIG. 3 is a sectional view schematically illustrating an example of the structure of the polarizing plate of the invention.
Figure 4:
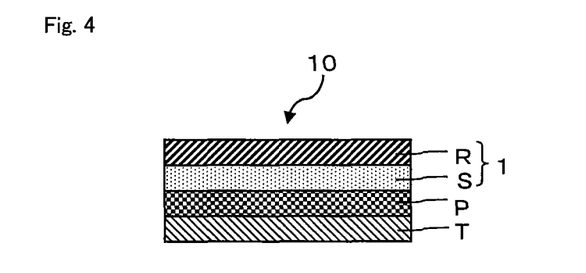
FIG. 4 is a sectional view schematically illustrating an example of the structure of the polarizing plate of the invention.

Furthermore, in another mode, as shown in FIG. 3, the polarizing plate of the invention may include a polarizer P, the optical film of the invention R placed on one surface of the polarizer P, and the transparent protective film T placed on the other surface of the polarizer P.

When the optical laminate 1 includes a substrate S and the optical film R placed on and bonded to the substrate R is used, any of the surfaces of the optical film R and the substrate S may face the polarizer P, but the substrate S) is preferably placed so as to face the polarizer P. In such a structure, the substrate S can also serve as a transparent protective film for an optical compensation layer-carrying polarizing plate. Specifically, the transparent protective film T is not placed on both sides of the polarizer P, but on one side of the polarizer P, and the optical laminate of the invention 1 is placed on the other side such that the substrate S faces the polarizer P, so that the substrate S of the optical laminate 1 can also serve as a transparent protective film. This structure provides a much thinner polarizing plate.

The polarizer P to be used may be of various types with no particular limitation. For example, the polarizer may be a product produced by the steps of adsorbing a dichroic material such as iodine or a dichroic dye on a hydrophilic polymer film such as a polyvinyl alcohol-based film, a partially-formalized polyvinyl alcohol-based film, or a partially-saponified ethylene-vinyl acetate copolymer-based film and uniaxially stretching the film or may be a polyene-based oriented film such as a dehydration product of polyvinyl alcohol or a dehydrochlorination product of polyvinyl chloride. In particular, a polarizing layer including a polyvinyl alcohol-based film and a dichroic material such as iodine is preferred. The thickness of the polarizing layer is generally, but not limited to, about 5 to 80 μm.

The thickness of the transparent protective film is generally from about 1 to 500 μm, preferably from 1 to 300 μm, more preferably from 5 to 200 μm, particularly preferably from 5 to 150 μm, in view of strength, workability such as handleability, thin layer formability, or the like, while it may be determined as appropriate.

The optical film, optical laminate, or polarizing plate of the invention is preferably used for image displays such as liquid crystal displays, organic electroluminescence (EL) displays, and plasma display panels, while it may be used for any application. For example, such image displays may be used for OA equipment such as personal computer monitors, notebook computers, and copy machines; portable device such as cellular phones, watches, digital cameras, personal digital assistances (PDAs), and portable game machines; home appliance such as video cameras, televisions, and microwave ovens; vehicle equipment such as back monitors, monitors for car navigation systems, and car audios; display equipment such as information monitors for stores; alarm systems such as surveillance monitors; and care and medical device such as care monitors and medical monitors.

In particular, the wavelength dispersion of the optical film of the invention can be controlled by controlling the amounts of the polymers, while the high ability to develop birefringence and the high transparency are maintained. Therefore, the optical film of the invention can serve as an optical compensation film for compensation for liquid crystal cell birefringence, so that various liquid crystal cells can be optically compensated in an appropriate manner.

EXAMPLES

The invention is described below with reference to examples which are not intended to limit the scope of the invention. The examples and the comparative examples were evaluated by the methods described below.
(Δnxz and Wave Dispersion)

KOBRA-WPR (trade name) manufactured by Oji Scientific Instruments and the program included in the system were used to calculate the birefringence $\Delta nxz(\lambda)$ in the thickness direction at the wavelength λ nm from the in-plane retardation and the retardation at an angle of 40° which a sample is inclined at the measurement wavelength λ (λ=450 nm and 550 nm). The retardation $Rth(\lambda)$ in the thickness direction at a wavelength of λ nm was calculated from the resulting value according to formula $Rth(\lambda)=\Delta nxz(\lambda) \times d$, and the wavelength dispersion ($Rth(450)/Rth(500)$) was calculated from the resulting values. The thickness of the film used was determined from the difference between the thickness of the polymer-coated glass and the thickness of the glass uncoated with the polymer using Dektak manufactured by Sloan Technology Corporation.

A measurement of haze was performed by a haze meter (HM-150 (trade name), manufactured by Murakami Color Research Laboratory).

Production of Polymer Having Repeating Unit Represented by Formula (I)

Production Example 1

A solution of 3.27 g of 2,2-bis(3,5-dimethyl-4-hydroxyphenyl)-4-methylpentane and 0.20 g of methyl tri-n-octylammonium chloride in 35 ml of 1 M potassium hydroxide was prepared in a reaction vessel equipped with a stirrer. Under stirring of the solution, a solution prepared by adding 35 ml of chloroform to 1.53 g of 4,4'-stilbenedicarboxylic acid chloride and 1.02 g of terephthalic acid chloride was added at a time, and the mixture was stirred at room temperature (20° C.) for 90 minutes so that the reaction was allowed to proceed. The polymerization solution was then allowed to stand and separate. The chloroform solution containing the polymer was separated and then washed with an aqueous acetic acid solution and with ion-exchanged water. The chloroform solution was then poured into methanol so that the polymer was precipitated. The precipitated polymer was separated by filtration and dried under reduced pressure to give 4.66 g of a white polymer represented by Formula (VIII) below. The resulting polymer is named "polymer A."

[Formula (VIII)]

Production of Polymer Having Repeating Unit Represented by Formula (II)

Production Example 2

A solution of 2.70 g of 2,2-bis(4-hydroxyphenyl)-4-methylpentane and 0.06 g of benzyl triethyl ammonium chloride in 25 ml of a 1 M sodium hydroxide solution was prepared in a reaction vessel equipped with a stirrer. Under stirring of the solution, a solution prepared by adding 25 ml of chloroform to 1.52 g of terephthalic acid chloride and 0.51 g of isophthalic acid chloride was added at a time, and the mixture was stirred at room temperature (20° C.) for 90 minutes so that the reaction was allowed to proceed. The polymerization solution was then allowed to stand and separate. The chloroform solution containing the polymer was separated and then washed with an aqueous acetic acid solution and with ion-exchanged water. The chloroform solution was then poured into methanol so that the polymer was precipitated. The precipitated polymer was separated by filtration and dried under reduced pressure to give 3.41 g of a white polymer represented by Formula (IX) below. The resulting polymer is named "polymer B."

[Formula (X)]

[Formula (IX)]

Production of Soluble Polyimide

Production Example 3

To a reaction vessel (500 mL) equipped with a mechanical stirrer, a Dean-Stark apparatus, a nitrogen-introducing tube, a thermometer, and a condenser tube were added 17.77 g (40 mmol) of 2,2'-bis(3,4-dicarboxyphenyl)hexafluoropropanoic dianhydride (manufactured by Clariant (Japan) K.K.) and 12.81 g (40 mmol) of 2,2-bis(trifluoromethyl)-4,4'-diaminobiphenyl (manufactured by Wakayama Seita Kogyo Co., Ltd.). Subsequently, a solution in which 2.58 g (20 mmol) of isoquinoline is dissolved in 275.21 g of m-cresol was added to the reaction vessel, and the mixture was stirred (600 rpm) at 23° C. for 1 hour to give a uniform solution. The reaction vessel was then heated with an oil bath so that the temperature of the inside of the reaction vessel reached 180° C., and the mixture was stirred for 5 hours with the temperature maintained, resulting in an yellow solution. After the solution was further stirred for 3 hours, heating and stirring were stopped, and the product was allowed to cool to room temperature so that a polymer was precipitated in the form of a gel.

Acetone was added to the yellow solution in the reaction vessel so that the above gel was completely dissolved to prepare a diluted solution (7% by weight). The diluted solution was gradually added to 2 L of isopropyl alcohol under stirring to give a white powder precipitate. The powder was separated by filtration and then added into 1.5 L of isopropyl alcohol for washing. After the same process was performed once again to wash, the powder was separated again by filtration. In an air circulation type thermostatic oven, the powder was dried at 60° C. for 48 hours and then dried at 150° C. for 7 hours to give a powder of polyimide represented by structural Formula (1) below (85% yield). The polyimide had a weight average molecular weight (Mw) of 124,000 and an imidation rate of 99.9%. The resulting polymer is named "polymer C."

Preparation of Optical Film

Example 1

Polymers A and B obtained in the production examples were dissolved in a weight ratio of 5:95 in toluene. The solution was applied to a glass plate by a spin coating method and dried at 70° C. for 5 minutes and further dried at 110° C. for 4 minutes, so that an optical film with a thickness of 5.95 μm was obtained.

Example 2

An optical film with a thickness of 4.58 μm was obtained using the process of Example 1, except that the weight ratio of polymer A to polymer B was changed to 25:75.

Example 3

An optical film with a thickness of 4.65 μm was obtained using the process of Example 1, except that the weight ratio of polymer A to polymer B was changed to 50:50.

Example 4

An optical film with a thickness of 5.97 μm was obtained using the process of Example 1, except that the weight ratio of polymer A to polymer B was changed to 75:25.

Example 5

An optical film with a thickness of 5.87 μm was obtained using the process of Example 1, except that the weight ratio of polymer A to polymer B was changed to 95:5.

Comparative Example 1

Polymers A and C obtained in the production examples were dissolved in a weight ratio of 5:95 in cyclopentanone. The solution was applied to a glass plate by a spin coating method and dried at 70° C. for 5 minutes and further dried at 110° C. for 4 minutes, so that an optical film with a thickness of 5.23 μm was obtained.

Comparative Example 2

An optical film with a thickness of 4.76 μm was obtained using the process of Comparative Example 1, except that the weight ratio of polymer A to polymer C was changed to 25:75.

Comparative Example 3

An optical film with a thickness of 5.54 μm was obtained using the process of Comparative Example 1, except that the weight ratio of polymer A to polymer C was changed to 50:50.

Comparative Example 4

An optical film with a thickness of 5.70 μm was obtained using the process of Comparative Example 1, except that the weight ratio of polymer A to polymer C was changed to 75:25.

Comparative Example 5

An optical film with a thickness of 5.34 μm was obtained using the process of Comparative Example 1, except that the weight ratio of polymer A to polymer C was changed to 5:95.

The wavelength dispersion D (=Rth(450)/Rth(550)), the measured birefringence, and the measured haze of each of the optical films obtained in the examples and the comparative examples are shown in Table 1.

TABLE 1

| | Polymer Content Ratio (wt %) | | | Optical Film Properties | | |
| --- | --- | --- | --- | --- | --- | --- |
| | | | | Birefringence | Wavelength Dispersion | Transparency Haze |
| | Polymer A | Polymer B | Polymer C | $\Delta$ nxz[550] | D | (%) |
| Example 1 | 5 | 95 | — | 0.020 | 1.06 | 0.3 |
| Example 2 | 25 | 75 | — | 0.024 | 1.11 | 0.2 |
| Example 3 | 50 | 50 | — | 0.028 | 1.13 | 0.5 |
| Example 4 | 75 | 25 | — | 0.029 | 1.14 | 0.3 |
| Example 5 | 95 | 5 | — | 0.036 | 1.16 | 0.3 |
| Comparative Example 1 | 5 | — | 95 | 0.040 | 1.08 | 3.4 |
| Comparative Example 2 | 25 | — | 75 | 0.039 | 1.09 | 5.0 |
| Comparative Example 3 | 50 | — | 50 | 0.038 | 1.12 | 4.9 |
| Comparative Example 4 | 75 | — | 25 | 0.037 | 1.15 | 7.7 |
| Comparative Example 5 | 95 | — | 5 | 0.036 | 1.16 | 3.8 |

Polymer A having the repeating unit represented by Formula (I) and polymer B having the repeating unit represented by Formula (II) were both highly soluble in the solvent and compatible with each other even in such a relatively-low polarity solvent as toluene. In addition, the optical film of each example containing these polymers had a haze of less than 1.0% and transparency, even though the different polymers were mixed with each other. In contrast, since polymer C was insoluble in toluene, cyclopentanone was used as the solvent for the preparation of the optical film in the comparative examples. The optical film of each comparative example had a high haze and lacked a certain level of transparency necessary for optical films, because the polymers did not form a compatible system.

The invention claimed is:

1. An optical film comprising:
a polymer having a repeating unit represented by Formula (III); and
a polymer having a repeating unit represented by Formula (II);

[Formula (III)]

wherein in Formula (III), $A_1$ and $B_1$ each represents a substituent on the benzene ring, and $a_1$ and $b_1$ each represents the number (an integer of 0 to 4) of the corresponding substituents represented by each of $A_1$ and $B_1$, $A_1$ and $B_1$ each independently represents hydrogen, halogen, an alkyl group of 1 to 6 carbon atoms, or a substituted or unsubstituted aryl group, $R^1$ and $R^2$ each independently represent a straight-chain or branched alkyl group of 1 to 10 carbon atoms or a substituted or unsubstituted aryl group, $R^3$ to $R^6$ each independently represent a hydrogen atom, a halogen atom, a straight-chain or branched alkyl group of 1 to 6 carbon atoms, a cycloalkyl group of 5 to 10 carbon atoms, or a substituted or unsubstituted aryl group, provided that at least one of $R^3$ to $R^6$ is not a hydrogen atom;

[Formula (II)]

wherein in Formula (II), $A_2$, $D_2$, and $E_2$ each represent a substituent on the benzene ring, and $a_2$, $d_2$, and $e_2$ each represent the number (an integer of 0 to 4) of the corresponding substituents represented by each of $A_2$, $D_2$, and $E_2$, $A_2$, $D_2$, and $E_2$ each independently represent hydrogen, halogen, an alkyl group of 1 to 6 carbon atoms, or a substituted or unsubstituted aryl group, $X_2$ represents a single covalent bond, an unsaturated double bond, an unsaturated triple bond, or at least one atom or group selected from the group consisting of a $CH_2$ group, a CHR group, a $CR_2$ group, a $C(CZ_3)_2$ group, a CO group, an O atom, a S atom, an $SO_2$ group, an $Si(CH_2CH_3)_2$ group, and an $N(CH_3)$ group, wherein R each independently represent a straight-chain or branched alkyl group of 1 to 6 carbon atoms or a substituted or unsubstituted aryl group, Z represents halogen, $r_2$ represents 1 or 2, and $p_2$ and $q_2$ each represent an integer of 1 to 3.

2. The optical film according to claim 1, wherein Formula (II) is Formula (IV) below;

[Formula (IV)]

wherein in Formula (IV), $A_2$ and $a_2$ each have the same meaning as in Formula (II), $R^7$ and $R^8$ each independently represent a straight-chain or branched alkyl group of 1 to 6 carbon atoms or a substituted or unsubstituted aryl group, $R^9$ to $R^{12}$ each independently represent a hydrogen atom, a halogen atom, a straight-chain or branched alkyl group of 1 to 6 carbon atoms, or a substituted or unsubstituted aryl group (provided that at least one of $R^9$ to $R^{12}$ is not a hydrogen atom.

3. The optical film according to claim 2, wherein $R^7$ in Formula (IV) is a methyl group, and $R^8$ in Formula (IV) is a straight-chain or branched alkyl group of 2 to 4 carbon atoms.

4. The optical film according to claim 2, wherein $R^9$ to $R^{12}$ in Formula (IV) are each independently a straight-chain or branched alkyl group of 1 to 4 carbon atoms.

5. The optical film according to claim 2, wherein $R^1$ in Formula (III) is a methyl group, and $R^2$ in Formula (III) is a straight-chain or branched alkyl group of 2 to 4 carbon atoms.

6. The optical film according to claim 2, wherein $R^3$ to $R^6$ in Formula (III) are each independently a straight-chain or branched alkyl group of 1 to 4 carbon atoms.

7. The optical film according to claim 1, wherein the polymer having the repeating unit represented by Formula (III) and the polymer having the repeating unit represented by Formula (II) are in a weight ratio of 1:99 to 99:1.

8. The optical film according to claim 1, wherein the optical film has a thickness of 20 μm or less.

9. The optical film according to claim 1, wherein the optical film has a ratio D=Rth(450)/Rth(550) of the retardation (Rth (450)) in the thickness direction at a wavelength of 450 nm to the retardation (Rth(550)) in the thickness direction at a wavelength of 550 nm in the range of 1.02 to 2.00.

10. The optical film according to claim 1, wherein the optical film has a haze of 1.0% or less.

11. The optical film of claim 1, wherein a refractive index (nz) in the film thickness direction of the optical film is smaller than the maximum (nx) an in-plane refractive index thereof.

12. A polarizing plate, comprising a polarizer and the optical film of claim 1.

13. An image display device, comprising the polarizing plate of claim 12.

14. An image display device, comprising the optical film of claim 1.

15. A method for producing the optical film of claim 1, comprising the steps of:
    preparing a solution comprising the polymer represented by Formula (III), the polymer represented by Formula (II), and a solvent;
    applying the solution to a surface of a polymer substrate; and
    drying the applied solution.

* * * * *